(12) United States Patent
Sedlak et al.

(10) Patent No.: US 6,523,261 B1
(45) Date of Patent: Feb. 25, 2003

(54) METHOD OF MAKING A METALLIC PRESS FITTING ELEMENT

(75) Inventors: Bernd Sedlak, Mülheim (DE); Richard Krüger, Rottweil/Neufra (DE)

(73) Assignee: Mapress GmbH & Co. KG, Langenfeld (DE)

( * ) Notice: Subject to any disclaimer, the term of this patent is extended or adjusted under 35 U.S.C. 154(b) by 0 days.

(21) Appl. No.: 09/621,042

(22) Filed: Jul. 21, 2000

(30) Foreign Application Priority Data

Jul. 22, 1999 (DE) ......................................... 199 34 899
Jun. 15, 2000 (DE) ......................................... 100 29 480
Jun. 15, 2000 (DE) ......................................... 100 29 479

(51) Int. Cl.$^7$ ............................................. B21D 51/16
(52) U.S. Cl. ............................. 29/890.141; 29/890.14; 29/508
(58) Field of Search ................. 29/890.14, 890.141, 29/890.145, 890.148, 890.149, 508, 890.144; 72/68, 106, 20.1, 31.01, 416, 59, 62; 148/519, 520; 425/392

(56) References Cited

U.S. PATENT DOCUMENTS

| | | | | |
|---|---|---|---|---|
| 1,972,872 A | * | 9/1934 | Cornell | 148/519 |
| 2,089,784 A | * | 8/1937 | Cornell, Jr. | 285/148.9 |
| 2,120,067 A | * | 6/1938 | Gray et al. | 285/289.5 |
| 2,309,666 A | | 2/1943 | Parker | |
| 2,458,854 A | * | 1/1949 | Hull et al. | 72/58 |
| 3,149,861 A | * | 9/1964 | Larsson | 285/349 |
| 3,432,887 A | * | 3/1969 | Poux et al. | 425/522 |
| 3,595,047 A | * | 7/1971 | Fanning | 72/58 |
| 3,596,939 A | * | 8/1971 | Gibson | 285/382.2 |
| 3,823,216 A | * | 7/1974 | Petzetakis | 264/571 |

(List continued on next page.)

FOREIGN PATENT DOCUMENTS

| | | |
|---|---|---|
| DE | 11 87 870 | 2/1965 |
| DE | 39 19 496 C1 | 7/1990 |
| DE | 43 36 361 A1 | 4/1995 |
| DE | 295 04 502 U1 | 6/1995 |
| EP | 0 343 395 B1 | 6/1996 |
| EP | WO 01/39907 A1 * | 6/2001 |
| GB | 997552 * | 1/1962 |

OTHER PUBLICATIONS

Publication Mannesmann "Pressfitting–System/Sanitär", ed. Aug. 1994.

*Primary Examiner*—S. Thomas Hughes
*Assistant Examiner*—Marc Jimenez
(74) *Attorney, Agent, or Firm*—Henry F. Feiereisen

(57) ABSTRACT

A metallic press fitting element is made from a solid or hollow bar as starting material which is treated by a machining process, or by a machining process and a subsequent non-cutting process, to form a finished press fitting element with a pressing zone destined for connection of a pipe. The pressing zone is comprised of a hook-shaped region of substantially roof-shaped cross section for receiving an O-ring gasket, and an adjacent cylindrical region positioned inwardly of the hook-shaped region distal to an insertion end for the pipe into the pressing zone. The pressing zone is so machined or, as an alternative, machined and subsequent non-cutting procedure as to have a shape and wall thickness in correspondence to a pressing zone of a sheet metal press fitting element that has been cold press formed, so that the finished press fitting element is plastically deformable to realize a non-detachable and tight connection between the finished press fitting element and the pipe upon attachment of a pressing tool, which includes at least two clamping jaws, and closing of the jaws of the pressing tool, whereby during pressing action, the jaws of the pressing tool so act upon the hook-shaped region with received O-ring gasket as well as upon the cylindrical region of the pressing zone that the apex of the hook-shaped region is diametrically reduced and areas adjacent to the apex of the hook-shaped region are pushed toward one another.

33 Claims, 3 Drawing Sheets

U.S. PATENT DOCUMENTS

| | | | | |
|---|---|---|---|---|
| 3,916,502 A | * | 11/1975 | Bagnulo | 29/451 |
| 3,927,450 A | * | 12/1975 | Sommer et al. | 29/898.066 |
| 3,953,247 A | * | 4/1976 | Elhaus et al. | 148/508 |
| 4,055,445 A | * | 10/1977 | Pops | 148/554 |
| 4,403,938 A | * | 9/1983 | Seach et al. | 425/393 |
| 4,557,128 A | * | 12/1985 | Costabile | 72/62 |
| 4,643,658 A | * | 2/1987 | Gordon | 425/110 |
| 4,826,028 A | * | 5/1989 | Vassallo et al. | 277/615 |
| 4,850,096 A | * | 7/1989 | Gotoh et al. | 29/508 |
| 5,090,743 A | * | 2/1992 | Obering | 29/890.148 |
| 5,150,519 A | * | 9/1992 | Unewisse | 29/890.14 |
| 5,168,618 A | * | 12/1992 | Unewisse et al. | 29/508 |
| 5,277,719 A | * | 1/1994 | Kuhlman et al. | 148/694 |
| 5,938,865 A | * | 8/1999 | Kondo et al. | 148/593 |
| 6,049,962 A | * | 4/2000 | Pfeiffer | 29/515 |
| 6,164,106 A | * | 12/2000 | Nghiem et al. | 72/20.1 |
| 6,327,771 B1 | * | 12/2001 | Anglin et al. | 29/523 |

* cited by examiner

METHOD OF MAKING A METALLIC PRESS FITTING ELEMENT

CROSS-REFERENCES TO RELATED APPLICATIONS

This application claims the priority of German Patent Applications, Serial Nos. DE 199 34 899.5, filed Jul. 22, 1999, DE 100 29 479.0, filed Jun. 15, 2000 and DE 100 29 480.4, filed Jun. 15, 2000, the subject matter of which is incorporated herein by reference.

BACKGROUND OF THE INVENTION

The present invention relates, in general, to a method of making a metallic press fitting element.

Press fitting elements, involved here, come in various designs and are shown by way of example in FIGS. 1 to 8. FIG. 1 shows a sleeve 1, and FIG. 2 shows a sliding sleeve 2. Both these press fitting elements 1, 2 are characterized by a hook-shaped region 3 of substantially roof-shaped cross section for insertion of an O-ring gasket (not shown), and a cylindrical region 4 formed inwardly of the hook-shaped region 3 at a distant to the insertion end of a pipe (not shown) that is intended for connection to the sleeve 1 or sliding sleeve 2. FIG. 3 shows a representation of a street union 5 with internal thread, and FIG. 4 shows a street fitting 6 with outer thread. Both, the street union 5 and the street fitting 6 are characterized by a hexagon zone 7 for attachment of a wrench (not shown) to establish the connection. The extent of material removal can be reduced when using a starting material which has an outer hexagon profile either across its entire length or reduced to this zone. FIGS. 5 and 6 show press fitting elements 8, 9 of a type that is identical to the fittings of FIGS. 3 and 4 but for the additional provision of a short cylindrical region 10 upon the hook-shaped region 3. FIG. 7 shows a 90° branch 11 with internal thread, and FIG. 8 shows a side view of a ceiling elbow 12 which includes an attachment plate 13. Also the press fitting elements 11, 12 are suitable for manufacture by the method according to the present invention, even though the extent of material removal is necessarily increased compared to purely rotationally symmetrical press fitting elements. The attachment plate 13 for the ceiling elbow 12 is made separately and connected to the actual press fitting element by welding or soldering.

According to a publication, issued by Mannesmann and entitled "Pressfitting-System/Sanitär", ed. 8/1994, press fittings are known to be made from carbon steel or high alloy steel for installation in buildings. A core element of the described system is a press fitting which is made from a pipe section and is plastically deformable, for use as sleeve, bend, tee or reducer. A drawback of these conventional fittings is the need to make the fitting in several forming steps from a portion of a particularly manufactured pipe in order to meet the high requirements with respect to surface and dimensional tolerances. The initial pipe from which the fitting is made is normally a seamless pipe or a pipe made through straight bead welding and has narrow tolerances and a high-grade surface. The initial pipe is cut into sections, and the final configuration of the fitting is realized by carrying out several shaping steps, e.g. necking, flanging, pressing. As the starting material is already of fairly high quality, the resultant fitting becomes relatively expensive. Another drawback of this manufacturing process is its applicability for only standard fittings. For other fittings that may include threads such as street fittings or bends as well as ceiling elbows and street elbows, the afore-mentioned manufacturing method is not applicable.

German Pat. No. 39 19 496 C1 describes a manufacturing process by which the area that is specific for the type of fitting is made from a base body cast from a metallic material and securely fixed to a standardized adapter made of sheet metal. The connection may be realized by welding, soldering or cementing. This manufacturing process suffers also shortcomings because of the need to make a separate adapter, the need for a connection, and the problems associated with a control of the connection seam.

European Pat. No. 0 343 395 B1 described a press-fit arrangement in which a connection piece of an armature or a fitting of cast metal is pressed onto an unreinforced pipe which does not have any substantial changes to the wall thickness in the area of the press-fit. The compressive yield point of the connection piece is thereby at best as great as that of the pipe. The wall thickness of the connection piece is so sized as to withstand a recovery in shape of the pipe due to its elasticity after stress removal. Examples of cast metal include a red brass alloy which contains approximately 2% Sn, 8% Zn, 5% Pb, 2.2–3.0% Ni and the rest copper. Red brass is basically a brittle material which cannot plastically deform without cracking. As a consequence, the wall thickness should be thin enough in the pressing zone of the connection piece, on the one hand, and should be thick enough to withstand the elastic recovery of the pipe. Moreover, the red brass alloy should have a sufficient Ni-content to enhance the fracture strain.

German patent publication DE-AS 11 87 870 describes a method of making a pipe joint comprised of a plastically deformable metallic coupling sleeve of steel, which is made through compression molding. As an alternative, a turning process may also be use to make the coupling sleeve. The produced coupling sleeve has a hook-shaped region of substantially roof-shaped cross section for receiving an O-ring gasket, and a cylindrical region formed inwardly of the hook-shaped region at a distant to the insertion end of a steel pipe to be joined to the coupling sleeve. A nondetachable tight joint between the coupling sleeve and the steel pipe is implemented by suitably attaching and closing two clamping jaws. During squeezing action, the clamping jaws act upon the hook-shaped region with inserted O-ring gasket and the cylindrical region of the coupling sleeve, thereby reducing the diameter of both contacted regions. A drawback of this process resides in the fact that the O-ring gasket is only slightly compressed during the squeezing action, so that the seal is sufficient only for small pressures. A further drawback associated in particular in conjunction with coupling sleeves of steel is the creation during the turning process of a flow chip which can get wedged into the hook-shaped region. As a result, the turning process is impaired and the lathe tool may ultimately be destroyed. Thus, extended breakdown periods and shutdown periods are experienced, so that the costs for the press fitting element are increased.

German Pat. No. DE 295 04 502 U1 describes a method of making a compressible fitting made of malleable cast iron. This fitting has all the features of a conventional press fitting made of sheet metal. A drawback of this manufacturing process is the need to subject the blanks to an annealing process to impart a useable structure. Subsequently, the blanks are machined to remove the outer crust and to correct dimensional inaccuracies. These types of press fittings of malleable cast iron are not permitted for internal pressures exceeding 25 bar.

SUMMARY OF THE INVENTION

It is thus an object of the present invention to provide an improved method of making a metallic press fitting element, obviating the afore-stated drawbacks.

In particular, it is an object of the present invention to provide an improved method of making a metallic press fitting element irrespective of the used metallic material.

It is yet another object of the present invention to provide an improved method of making in particular rotationally symmetrical press fitting elements in a cost-efficient and reproducible manner for application at operating pressures of up to 40 bar.

These objects, and others which will become apparent hereinafter, are attained in accordance with the present invention by a method which includes as starting material a solid or hollow bar which is machined, or alternatively machined and shaped without material removal, to form a finished press fitting element with a pressing zone destined for connection of a pipe, with the pressing zone comprised of a hook-shaped region of substantially roof-shaped cross section for receiving an O-ring gasket, and an adjacent cylindrical region positioned inwardly of the hook-shaped region distal to an insertion end for the pipe into the pressing zone, whereby the pressing zone is so machined, or alternatively machined and shaped without material removal, as to have a shape and wall thickness in correspondence to a pressing zone of a sheet metal press fitting element that has been cold press formed, so that the finished press fitting element is plastically deformable to realize a non-detachable and tight connection between the finished press fitting element and the pipe upon attachment of a pressing tool, which includes at least two clamping jaws, and closing of the jaws of the pressing tool, whereby during pressing action, the jaws of the pressing tool so act upon the hook-shaped region with received O-ring gasket as well as upon the cylindrical region of the pressing zone that the apex of the hook-shaped region is diametrically reduced and areas adjacent to the apex of the hook-shaped region are pushed toward one another.

The solid bar or hollow bar may be made through continuous casting or extruding. Turning is a preferred process for the machining operation, whereas the non-cutting process as used in the alternative manufacturing process is implemented through cold forming, preferably pressing. The non-cutting process is utilized for shaping the hook-shaped region so that currently encountered problems associated with the machining process, such as turning, are now eliminated. In a best-case scenario, the manufacturing process includes only a single machining process and a single non-cutting shaping process. Of course, in some instances the use of more process steps may be appropriate.

The manufacturing method according to the present invention has the advantage that the clamping jaws, commercially available in large quantities, can be used without alteration while yet ensuring a tightness of the pipe joint that allows operating pressures of up to 40 bar. More importantly, however, the press fitting elements can be produced in accordance with the present invention in a much more cost-efficient manner than those made through a form pressing process. This is true in particular for press fitting elements that are configured as street fitting or street unions. These type of fittings are made conventionally as two parts, i.e. press fitting part and threaded part, with both parts joined together by welding, soldering or cementing. This joining technique as well as the need for necessary post-examination are eliminated by the method according to the present invention.

The structure of the starting material may be enhanced by shaping a continuous casting billet or continuous casting block into the solid bar or hollow bar by means of a single-stage or multi-stage rolling process, forging process or drawing process. For greater sizes, i.e. nominal width of $\geq 40$ mm, it may suitable to produce a single blank instead of a bar. The outer contour of the blank with overmeasure substantially corresponds to the final contour of the finished fitting whereby the final contour is realized by a machining process. The blank is made through forging or casting. In the case of making a blank through casting, the machining process is predominately applied for removing the outer crust.

For press fitting elements having an area for attachment of a holding tool, e.g. the hexagonal area of the street fitting or street union, a solid bar or hollow bar is prepared which has over its entire length an outer contour which is suitable as final contour. Taking into account the required tolerances, a hexagon bar is produced by a drawing process. It is then only necessary to shape the hexagonal zone required on the press fitting element with the desired width because the desired outer contour is already created in this area by the drawing process. The machining process is then implemented predominately for making the thread and the pressing zone. In the alternative method, the hook-shaped region is made thereby without material removal. When these components are based upon a forged or cast blank, also the hexagonal area must be machined when using the casting process. Suitable starting materials include plain carbon steels, stainless high alloy steels as well as red brass and brass. A preferred type of red brass includes an alloy with the designation CuSn5ZnPb with material number 2.1096.01.

As red brass is brittle and tends to crack, it is suitable to carry out a, heat treatment before or after the material removing process. Heat treatment may be needed also for press fitting elements of steel in view of their tendency to become compact. Practice has shown that press fitting elements made from high alloy steel and subject to soft annealing after carrying out the material removing step yield good results. The annealing temperature is about 1,100° C., and quenching is carried out at reduced atmosphere so as to prevent the need for refinishing procedures.

Ceiling elbows can be manufactured by making the actual press fitting element in accordance with the method of the present invention and by separately producing the attachment plate which is then connected to the press fitting element by welding or soldering. As the joining seam does not assume a sealing function, separate examination thereof is not necessary.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
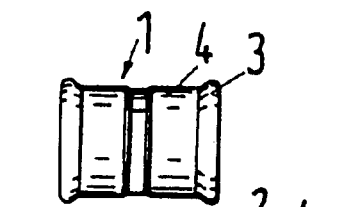
FIGS. 1 to 8 show various types of press fitting elements suitable to be made by the method according to the present invention.
Figure 2:
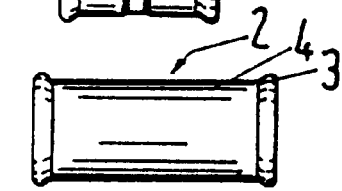

Throughout all the Figures, same or corresponding elements are generally indicated by same reference numerals.

Figure 3:
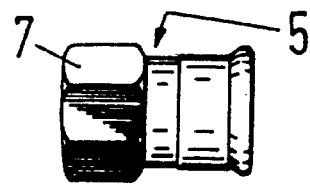
Figure 4:
Figure 5:
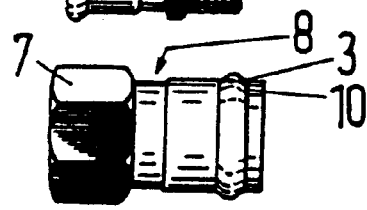
Figure 6:
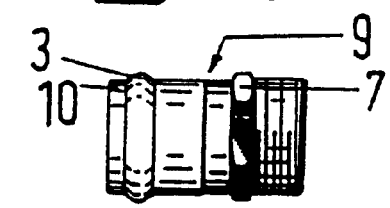
Figure 7:
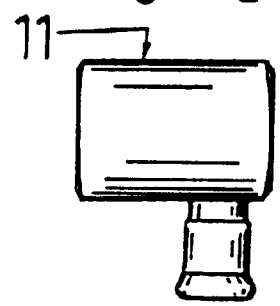
Figure 8:
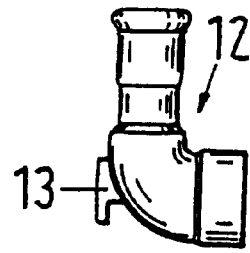

For sake of simplicity, the following description will refer to the manufacture of a press fitting element in the form of a street fitting 6 only, as shown by way of example in FIG. 4, but it will be understood by persons skilled in the art, that the method according to the present invention is applicable for any type of press fitting element, in particular those shown in FIGS. 1 to 8 so long as the concepts outlined here are generally followed. In general, the street fitting 6 is characterized by a hexagon zone 7 for attachment of a holding element (not shown). To connect the street fitting 6 to a threaded pipe (not shown), the street fitting 6 has a section 21 which includes in this example an external thread. A comparable press fitting element with internal thread is called street union, as shown in FIG. 3 and denoted by reference numeral 5. Following the hexagon zone 7 is the actual pressing zone comprised of a cylindrical region 22 and a hook-shaped region 23 formed outwardly of the cylindrical region 22 adjacent to the insertion end of the threaded pipe. The hook-shaped region 23 defines an internal circumferential groove 24 for insertion of an O-ring gasket (not shown).

Figure 9:
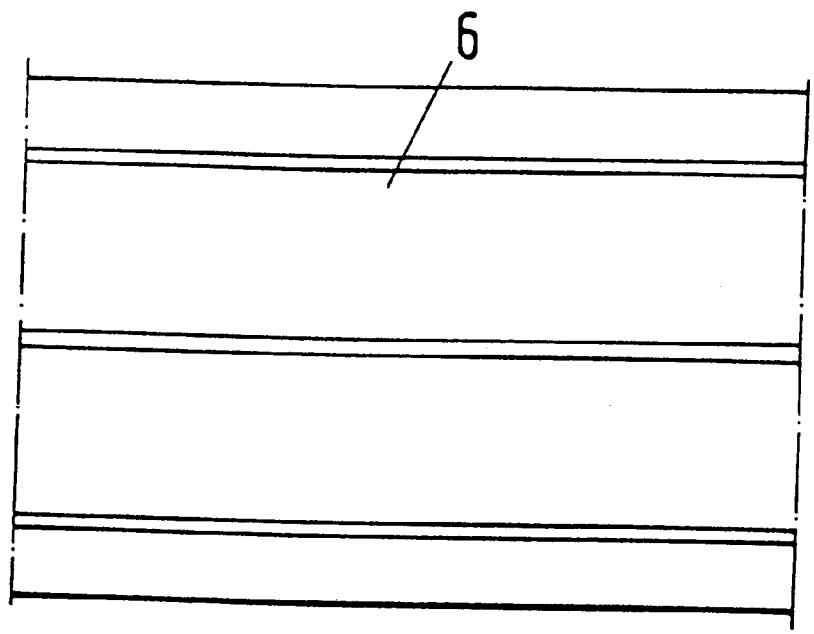
FIG. 9 is a longitudinal section of a solid bar with hexagon profile for use as starting material for making a press fitting element by a method according to the present invention.

Turning now to the drawing, and in particular to FIG. 9, there is shown a longitudinal section of a solid bar 20 with hexagon profile for use as starting material for making the street fitting 6 by a method according to the present invention. The solid bar 20 can be produced by forging or multiple drawing of a continuous casting billet or extrusion block and may be made of plain carbon steel, stainless high alloy steel, e.g. steel X5CrNiMo17-12-2 with material number 1.4401 or steel X6CrNiMoTi17-12-2 with material number 1.4571, red brass, e.g. CuSn2ZnPb with material number 2.1098.01 or CuSn5ZnPb with material number 2.1096.01, or a copper-zinc alloy (brass). The subsequent machining or material removal process can be implemented continuously upon a rod in a so-called automatic spindle machine, or piece-by-piece from a portion previously separated from the rod. It will be appreciated by persons skilled in the art that the use of the terms "machining" and "material removing process" in the description are used interchangeably and have the same meaning.

Figure 10:
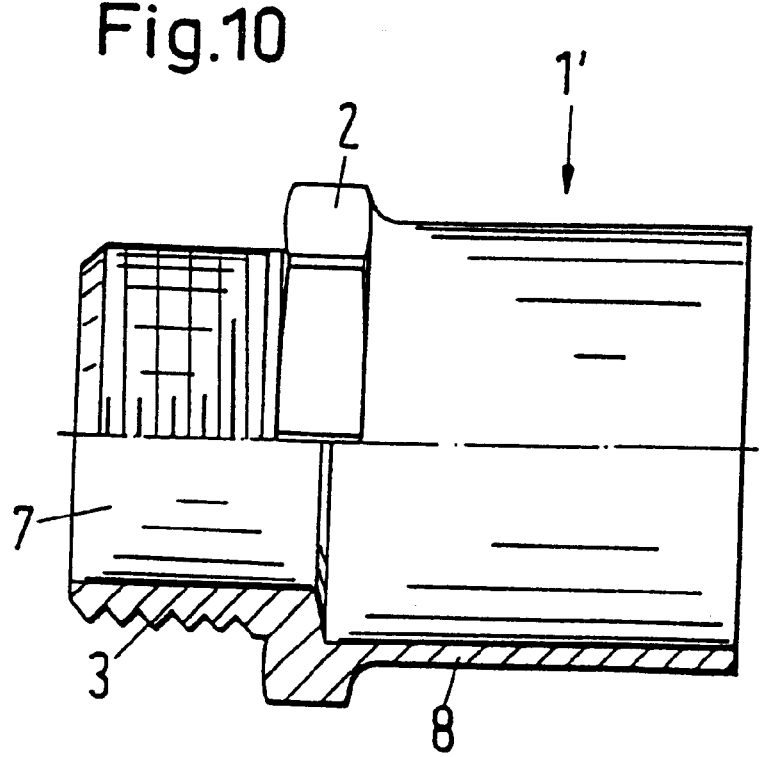
FIG. 10 is a partially sectional representation of the solid bar after carrying out a material removal process as initial step to make a street fitting in accordance with the method of the present invention.

In a next phase, as shown in FIG. 10, the solid bar 20 is subjected to a material removal process in order to form a bore 25, the threaded section 21 as well as the end faces of the hexagon zone 7. Reference numeral 26 refers to a section which constitutes the later pressing zone for attachment of a pressing tool (not shown).

Figure 11:
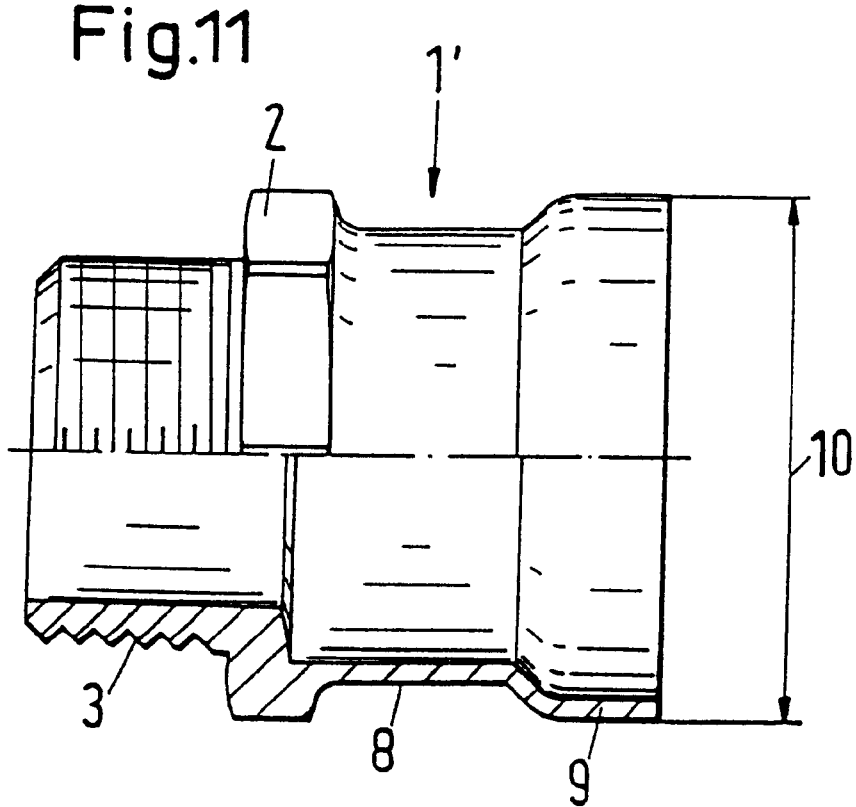
FIG. 11 is a partially sectional representation of the solid bar after carrying out a first non-cutting shaping process.

Subsequently, as shown in FIG. 11, the solid bar 20 is subjected to a first non-cutting procedure to provide a section 27 of expanded diameter 28 adjacent the insertion end for the threaded pipe. The expansion of the pressing zone 26 in the section 27 is realized by a pressing process. The outer diameter 28 corresponds substantially to the outer diameter of the hook-shaped region 23 of the finished street fitting 6 being produced.

Figure 12:
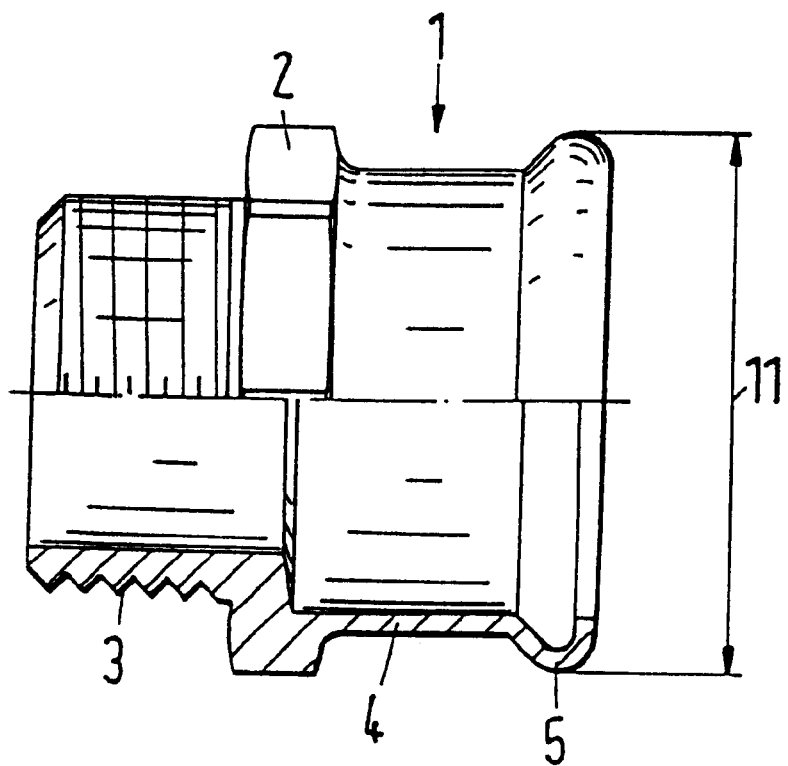
FIG. 12 is a partially sectional representation of the solid bar after carrying out a second non-cutting shaping process to produce the finished street fitting.

In a further non-cutting procedure, the expanded section 27 is shaped into the hook-shaped region 23, as shown in FIG. 12.

As an alternative, it is also possible to shape the pressing zone 26 into the configuration of FIG. 11 through a turning process and to apply only a single non-cutting procedure to form the hook-shaped region 23.

The thus produced street fitting 6 can be connected with the threaded pipe by applying a pressing tool (not shown) whose clamping jaws (not shown) are attached to the pressing zone 26 of the street fitting 6 in such a manner that upon closing of the jaws of the pressing tool, the jaws act during pressing action on the hook-shaped region 23 with contained O-ring gasket as well as on the cylindrical region 22 of the pressing zone 26 such that the apex of the hook-shaped region 23 is diametrically reduced and areas adjacent to the apex of the hook shaped region 23 are pushed toward one another.

Optionally, when made of high alloy steel, the finished press fitting element may be subjected to a heat treatment, e.g. annealing at a temperature of about 1100° C., and subsequently to quenching at presence of a reduced atmosphere.

While the invention has been illustrated and described as embodied in a method of making a metallic press fitting element, it is not intended to be limited to the details shown since various modifications and structural changes may be made without departing in any way from the spirit of the present invention.

What is claimed as new and desired to be protected by Letters Patent is set forth in the appended claims:

1. A method of making a one piece metallic press fitting element, comprising the steps of:

preparing a solid or hollow bar from a starting material through one of extrusion and continuous casting and a subsequent shaping operation without material removal;

machining the solid or hollow bar to form a press fitting element with a pressing zone to allow for press-fitting connection against a pipe; and expanding a section of the pressing zone by means of a pressing process and shaping the pressing zone into a hook-shaped region defining an apex for receiving an O-ring gasket, and an adjacent cylindrical region positioned inwardly of the hook-shaped region, wherein the pressing zone has a shape and wall thickness sufficient to allow plastic deformation of the press fitting element to realize a permanent connection with a pipe by applying a pressing force on the hook-shaped region when an O-ring gasket is placed in the hook-shaped region as well as applying a pressing force upon the cylindrical region of the pressing zone so that the apex of the hook-shaped region is diametrically reduced and areas adjacent to the apex of the hook-shaped region are pushed toward one another.

2. The method of claim 1 wherein the preparing step includes shaping a casting billet through a process selected from the group consisting of rolling process, forging process and drawing process.

3. The method of claim 1 wherein the solid bar or hollow bar is subsequently subjected to a process selected from the group consisting of forging process and drawing process.

4. The method of claim 1 wherein the starting material is a solid blank or hollow blank, having an outer contour with overmeasure to substantially correspond to a final contour of the press fitting element, whereby the final contour is realized through a machining process.

5. The method of claim 1 wherein the solid bar or hollow bar has over its entire length an outer contour which is suitable as final contour of the press fitting element having an area for attachment of a holding tool.

6. The method of claim 5, wherein the subsequent shaping operation comprises forging the starting material, and wherein the machining step comprises machining the area for attachment of the holding tool.

7. The method of claim 5 wherein the area destined for attachment of the holding tool has an outer contour in the form of a hexagon.

8. The method of claim 1 wherein the machining step includes turning.

9. The method of claim 1 wherein the starting material is made of a material selected from the group consisting of unalloyed carbon steel, stainless high alloy steel, red brass, a copper-zinc alloy, and brass.

10. The method of claim 9 wherein the stainless high alloy steel is a steel selected from the group consisting of X5CrNiMo17-12-2, and X6CrNiMoTi17-12-2.

11. The method of claim 9 wherein the red brass is selected from the group consisting of CuSn2ZnPb, and CuSn5ZnPb.

12. The method of claim 1, and further comprising the step of heat treating the starting material prior to the machining step.

13. The method of claim 1, and further comprising the step of heat treating the press fitting element.

14. The method of claim 13 wherein the heat treatment of the press fitting element includes annealing at a temperature of about 1100° C. and quenching at presence of a reduced atmosphere, when the press fitting element is made of high alloy steel.

15. The method of claim 1 wherein the machining step includes providing the press fitting element with a threaded section for threaded engagement with another pipe.

16. A method of making a one piece metallic press fitting element, comprising the steps of:

preparing a solid or hollow bar from a starting material through one of extrusion and continuous casting and a subsequent shaping operation without material removal;

treating the solid or hollow bar by a machining process and a subsequent shaping process without material removal, to form a press fitting element with a pressing zone to allow for connection with a pipe;

expanding a section of the pressing zone utilizing a pressing process and shaping the pressing zone into a hook-shaped region defining an apex for receiving an O-ring gasket, and an adjacent cylindrical region positioned inwardly of the hook-shaped region distal to an insertion end for a pipe into the pressing zone, wherein the pressing zone has a shape and wall thickness sufficient to allow plastic deformation of the press fitting element to realize a permanent connection between the press fitting element and a pipe by applying a pressing force on the hook-shaped region when an O-ring gasket is received in the hook-shaped region as well as applying a pressing force upon the cylindrical region of the pressing zone so that the apex of the hook-shaped region is diametrically reduced and areas adjacent to the apex of the hook-shaped region are pushed toward one another.

17. The method of claim 16 wherein the preparing step includes shaping a casting billet through a process selected from the group consisting of rolling process, forging process and drawing process.

18. The method of claim 16 wherein the solid bar or hollow bar is subsequently subjected to a process selected from the group consisting of forging process and drawing process.

19. The method of claim 16 wherein the the starting material is made from a solid blank or hollow blank, having an outer contour with overmeasure to substantially correspond to a final contour of the press fitting element, whereby the final contour is realized through a machining process.

20. The method of claim 26 wherein the solid bar or hollow bar has over its entire length an outer contour which is suitable as final contour of the press fitting element having an area for attachment of a holding tool.

21. The method of claim 20 wherein the subsequent shaping operation comprises forging the starting material, and wherein the machining step comprises machining the area for attachment of the holding tool.

22. The method of claim 20 wherein the area destined for attachment of the holding tool has an outer contour in the form of a hexagon.

23. The method of claim 16 wherein the machining step includes turning.

24. The method of claim 16 wherein the shaping process is a cold forming process.

25. The method of claim 16 wherein the hook-shaped region is made through the shaping process.

26. The method of claim 16 wherein said treating step includes at least one shaping process.

27. The method of claim 16 wherein the starting material is made of a material selected from the group consisting of unalloyed carbon steel, stainless high alloy steel, red brass, a copper-zinc alloy and brass.

28. The method of claim 27 wherein the stainless high alloy steel is a steel selected from the group consisting of X5CrNiMo17-12-2, and X6CrNiMoTi17-12-2.

29. The method of claim 27 wherein the red brass is selected from the group consisting of CuSn2ZnPb, and CuSn5ZnPb.

30. The method of claim 17, and further comprising the step of heat treating the starting material prior to the machining step.

31. The method of claim 16, and further comprising the step of heat treating the press fitting element.

32. The method of claim 31, wherein the heat treatment of the press fitting element includes annealing at a temperature of about 1100° C. and quenching at presence of a reduced atmosphere, when the press fitting element is made of high alloy steel.

33. The method of claim 16 wherein the machining step includes providing the press fitting element with a threaded section for threaded engagement with another pipe.

* * * * *